United States Patent [19]
Karppinen et al.

[11] Patent Number: 5,843,854
[45] Date of Patent: Dec. 1, 1998

[54] MINERAL FIBRE COMPOSITION

[75] Inventors: Kirsti Marjatta Karppinen, Abo; Michael Stig Folke Perander, Pargas; Peter Arnold Henrik Solin, Piispanristi; Antero Olavi Pehkonen, Esbo; Seija Marketta Maine, Pargas, all of Finland

[73] Assignee: Partek Paroc OY AB, Pargas, Finland

[21] Appl. No.: 444,543

[22] Filed: May 19, 1995

Related U.S. Application Data

[63] Continuation of Ser. No. 849,384, May 7, 1992, abandoned.

[30] Foreign Application Priority Data

Nov. 23, 1990 [FI] Finland ................... 905797

[51] Int. Cl.⁶ ................................. C03C 13/06
[52] U.S. Cl. ................... 501/36; 501/35; 501/63; 501/70; 501/72
[58] Field of Search ................... 501/35, 36, 63, 501/70, 72

[56] References Cited

U.S. PATENT DOCUMENTS

| | | | |
|---|---|---|---|
| 4,482,541 | 11/1984 | Telfer et al. | 424/128 |
| 4,678,659 | 7/1987 | Drake et al. | 424/451 |
| 4,783,429 | 11/1988 | Shibuya | 501/5 |
| 4,867,779 | 9/1989 | Meunier | 71/62 |
| 5,055,428 | 10/1991 | Porter | 501/35 |
| 5,108,957 | 4/1992 | Cohen | 501/35 |
| 5,250,488 | 10/1993 | Thelohan et al. | 501/36 |
| 5,332,699 | 7/1994 | Olds et al. | 501/36 |

FOREIGN PATENT DOCUMENTS

| | | |
|---|---|---|
| 0 009 418 | 4/1980 | European Pat. Off. . |
| 247 817 | 12/1987 | European Pat. Off. . |
| 0 412 878 A1 | 2/1991 | European Pat. Off. . |
| 0 412 878 A1 | 2/1991 | France . |
| 0 459 897 A1 | 12/1991 | France . |
| 63-242944 | 10/1988 | Japan . |
| 541808 | 1/1977 | U.S.S.R. . |
| 520247 | 4/1939 | United Kingdom . |
| WO 87/0500 | 8/1987 | WIPO . |

OTHER PUBLICATIONS

Ceramic Bulletin, vol. 57, No. 6(1978), pp. 602–604 *Chemical Durability of Glasses in the Systems $SiO_2$–$CaO$–$Na_2O$–$R_mO_n$* Ohta et al.
Biomaterials, *An Interfacial Approach*, L.L. Hench & E.C. Ethridge (1982) pp. 68–71, 134–148.
The Constitution of Glasses, A Dynamic Interpretation, Woldemar A. Weyl & Evelyn Chostner Marboe, pp. 568–571. 1964.
Erfahrungsaustausch, pp. 88–90 10(1959), No. 2.
Models for Physical Properties and Bioactivity of Phosphate Opal Glasses Glastech. Ber. 61 (1988) No. 10; pp. 300–305.
Effect of Minor Substitution of $SiO_2$ in the $Na_2O$ $SiO_2$ Glass on the Leaching Characteristics in Aqueous Medium, vol. 13, No. 4, (1968), pp. 97–102.
Scientific Basis for Nuclear Waste Management VII, Gary L. McVay; vol. 26 1984, pp. 755–761.
Ullmans (1976) pp. 359–365.

*Primary Examiner*—Melissa Bonner
*Attorney, Agent, or Firm*—Armstrong, Westerman, Hattori, McLeland & Naughton

[57] ABSTRACT

A mineral fibre composition which is soluble in biological fluids contains substantially 45–65% by weight of $SiO_2$ 15–40% by weight of $CaO$ 0–20% by weight of $MgO$ 0–6% by weight of $Na_2O+K_2O$ and in addition aluminium and/or iron oxides as well as phosphorus oxide in such amounts that the weight ratio of $P_2O_5$ to the sum of $Al_2O_3$ and iron oxide is circa 0.4 to 6.

3 Claims, No Drawings

MINERAL FIBRE COMPOSITION

This is a Continuation application of Ser. No. 07/849,384 filed May 7, 1992, now abandoned.

BACKGROUND OF THE INVENTION

The present invention relates to a mineral fiber composition which is soluble in biological fluids.

Mineral fibers made by melting and spinning of mineral raw materials, such as rock, slag and the like, are to a great extent used for the manufacture of mineral fiber mats and blankets, primarily for heat and sound insulation purposes within the construction industry. In addition to the formed mat exhibiting good insulation characteristics with respect to heat and sound, increasingly more importance has been recently attached to the characteristics of the mat from the viewpoint of health, primarily of industrial hygiene. This has lead to attention being directed increasingly more to developing fibers which are soluble in biological fluids in order to ensure that fiber particles, which are not transported out of the body, dissolve in the body fluid.

Thus e.g. the patent application WO 89/12032 describes a fiber composition which exhibits an increased solubility in physiological saline solutions. According to the specification, the components in these compositions may vary within wide limits, but according to the specification, an increase in the amount of amphoteric oxides, i.e. of aluminium, zirconium and titanium, tends to increase the stability of the compositions against extraction. Even though the application does not at all discuss the effects of the presence of phosphorus, there is included an example of a composition containing a little over 6% by weight of $P_2O_5$, in combination with a low content of $Al_2O_3$. This composition exhibits a fairly good solubility, primarily due to the small amount of $Al_2O_3$ present.

According to the present invention it has now been discovered that compositions which contain aluminium and/or iron oxides, as well as phosphorus oxide, and wherein the weight ratio of phosphorus to the sum of aluminium and iron, all calculated as their oxides, lies within a fairly narrow range, surprisingly exhibit very favourable solubility characteristics in physiological saline solutions.

The object of the present invention is thus a mineral fiber composition which is soluble in biological fluids and which is characterized in that it contains substantially 45–65% by weight of $SiO_2$
15–40% by weight of CaO
0–20% by weight of MgO
0–6% by weight of $Na_2O+K_2O$ and in addition aluminium and/or iron oxides as well as phosphorus oxide in such amounts that the weight ratio of $P_2O_5$ to the sum of $Al_2O_3$ and iron oxide is circa 0.4 to 6.

The total amount of $Al_2O_3$ and iron oxide is preferably at least circa 0.5, advantageously circa 0.5 to 7% by weight and the weight ratio is preferably circa 0.5 to 2.

The object of the invention is also a method for increasing the solubility of mineral fiber compositions which method is characterized in that to a mineral composition having a total $Al_2O_3$ and iron oxide content of at least circa 0.5% by weight, phosphorus is added in such an amount that the weight ratio of $P_2O_5$ to the sum of $Al_2O_3$ and iron oxide is circa 0.4 to 6, optimally circa 0.5 to 2.

DETAILED DESCRIPTION OF THE PREFERRED EMBODIMENTS

The invention thus makes it possible to utilize such common natural and economically feasible raw materials which generally contain a certain amount of aluminium and iron, which reduce the solubility and the presence of which consequently is not desirable in the manufacture of a soluble fiber. According to the invention the solubility of fibers made from such materials is increased by adding phosphorus in a suitable amount. This increases substantially the variation possibilities in the choice of raw materials whereby also economically advantageous raw materials can come into use.

The upper limit of added phosphorus oxide, which generally does not exceed circa 10% by weight of the composition, depends naturally on the aluminium and iron content and also on the fact that higher phosphorus oxide levels contribute to an undesired crystallization of the fibre and difficulties in raw material supply. An increase of the phosphorus oxide content also raises the melting temperature which leads to even poorer production economics.

In order for mineral fibers to be bioactive or soluble in biological fluids, a layer of calcium phosphate or apatite type material is required on the surface of the fiber. This outer layer is a result of migration of calcium and phosphate ions from the glass matrix outwards to the surface directed towards the biological fluid, which surface layer formation is further facilitated by the phosphate ions present in the biological fluid.

This formed layer gradually then separates in the form of very small particles thus exposing new fiber surface onto which new surface layers then can form. The glass matrix gradually being leached, the fiber disintegrates and disappears.

The presence of trivalent aluminium and iron has a stabilizing effect on the leaching of the glass matrix due to the fact that these metals tend to move to disrupted oxygen bridges in the glass, where the deterioration and leaching reactions of the glass take place. The phosphate ions, however, form complexes with these trivalent metal ions and weaken the oxygen bridges between the Si- and Al- and Fe-atoms, respectively. As a consequence of this, the network forming properties of these metals weaken in turn, which facilitates the breaking down of the glass.

The present invention is consequently based on a joint effect between phosphate and aluminium and trivalent iron, respectively, which cooperation in the mineral fibers according to the invention increases the solubility of the fiber.

In the following, when iron oxide is expressed as $Fe_2O_3$, this expression is intended to cover all types of iron oxides $Fe_xO_y$ present in the composition.

An advantageous fiberizable mineral fiber composition contains the following components at the amounts indicated:

| | |
|---|---|
| $SiO_2$ | 45–65% by weight |
| $Al_2O_3$ | 0.5–7% by weight |
| $Fe_2O_3$ | 0–5% by weight |
| CaO | 15–40% by weight |
| MgO | 0–20% by weight |
| $Na_2O + K_2O$ | 0–6% by weight |
| $P_2O_5$ | 0.5–10% by weight |

An especially advantageous composition has the following composition:

| | |
|---|---|
| $SiO_2$ | 49–56% by weight |
| $Al_2O_3$ | 1–5% by weight |
| $Fe_2O_3$ | 0–4% by weight |
| CaO | 25–35% by weight |

-continued

| | |
|---|---|
| MgO | 0–15% by weight |
| Na$_2$O + K$_2$O | 0–6% by weight |
| P$_2$O$_5$ | 0.5–5% by weight |

Solubility tests

1. Solubility in a Gamble Solution

In order to test the solubility, mineral fiber compositions according to the invention were compared with corresponding compositions which, however, contained no phosphate.

From quartz sand, calcium carbonate, Al-, Mg- and P-compounds a melt was prepared which after solidification was crushed and pulverized. The chemical composition was controlled, as was the particle size distribution. A specimen of 200 ml was rinsed with a Gamble solution having a flow rate of 2 ml/h. The Gamble solution had the following composition:

| | |
|---|---|
| MgCl$_2$ * 6H$_2$O | 0.16 g/l |
| NaCl | 6.11 g/l |
| KCl | 0.31 g/l |
| Na$_2$HPO$_4$ | 0.148 g/l |
| Na$_2$SO$_4$ | 0.079 g/l |
| CaCl$_2$ * 2H$_2$O | 0.06 g/l |
| NaCH$_3$COO * 3H$_2$O | 1.065 g/l |
| NaHCO$_3$ | 1.95 g/l |

The rate of dissolution was determined by measuring the concentrations of the main components of the material in the Gamble solution after specific time intervals. An atomic absorption spectrophotometer was used for the determinations.

| | Ia | Ib | IIa | IIb |
|---|---|---|---|---|
| Composition (% by weight) | | | | |
| SiO$_2$ | 55.2 | 58.8 | 54.1 | 54.2 |
| Al$_2$O$_3$ | 1.2 | 1.2 | 4.2 | 4.4 |
| Fe$_2$O$_3$ | 0.1 | 0.05 | 0.05 | 0.0 |
| CaO | 29.3 | 30.2 | 27.7 | 30.2 |
| MgO | 10.2 | 9.7 | 9.7 | 10.4 |
| Na$_2$O | 0.1 | 0.03 | 0.09 | 0.1 |
| K$_2$O | 0.0 | 0.02 | 0.02 | 0.02 |
| P$_2$O$_5$ | 1.7 | — | 3.9 | — |
| Solubility (mg/l) (1 day) | | | | |
| Si | 62.2 | 58.6 | 34.5 | 32.1 |
| Ca | 27.8 | 27.7 | 22.7 | 30.3 |
| Mg | 16.5 | 14.0 | 13.4 | 14.5 |

From the results it can be seen that the compositions Ia and IIa according to the invention which contained phosphate, had a better silicon solubility than the corresponding compositions Ib and IIb which were phosphate free. Magnesium and calcium solubilities remained rather constant.

2. Solubility in Culture Media with or without Macrophages

In this test the dissolution of three mineral fiber compositions were tested on the one hand in a commercial culture medium (RPMI 1640 Medium, Gibco Ltd, England) and also in the same culture medium containing in addition 95%, in a RPMI 1640 medium containing pencillin 100 IU/ml, streptomycin 100 μg/ml, 10 IU/ml heparin, 10% foetal calf serum and 2 mM L-glutamine, to a cell concentration of $1\times10^6$ cells/ml. 2 ml of cell suspension was added to and incubated in each well of Costar tissue culture clusters (Costar Europe Ltd, Holland), changing the medium to remove non-adherent cells, and incubated overnight. Following incubation, the medium was removed and fresh medium containing 200 μg/ml of mineral fibers were added to the wells. In control wells, only RPMI 1640 Medium with 200 μg/ml of mineral fiber was used. The clusters were incubated and the cells exposed to fibers for a predetermined time. The concentration of dissolved silicon from each of the samples was determined from the culture medium using atomic absorption spectrophotometer.

| Fibre compositions (% by weight) | | | |
|---|---|---|---|
| | A | B | C |
| SiO$_2$ | 54.7 | 50.4 | 59.0 |
| Al$_2$O$_3$ | 1.7 | 3.3 | 0.9 |
| Fe$_2$O$_3$ | 1.4 | 3.0 | 0.3 |
| CaO | 25.1 | 31.2 | 35.5 |
| MgO | 11.9 | 10.6 | 4.6 |
| Na$_2$O | 0.3 | 0.6 | 0.1 |
| K$_2$O | 0.1 | 0.4 | 0.1 |
| P$_2$O$_5$ | 5.2 | — | — |

Composition A is in accordance with the invention, compositions B and C otherwise fulfill the conditions of the invention, except that they do not contain any phosphorus.

The diameter of the fibres used in the tests was less than 3 μm.

The following solubility results for silicon were obtained after 2 days, 4 days and 8 days respectively.

| Composition | A | B | C |
|---|---|---|---|
| | Si (ppm; 2 days) | | |
| Culture medium | 26 | 5 | 26 |
| Culture medium + macrophages | 26 | 5 | 14 |
| | Si (ppm; 4 days) | | |
| Culture medium | 45 | 12 | 45 |
| Culture medium + macrophages | 45 | 8 | 35 |
| | Si (ppm; 8 days) | | |
| Culture medium | 162 | 45 | 144 |
| Culture medium + macrophages | 153 | 37 | 82 |

From the results it is apparent that the solubility of the composition B, which has a relatively high total content of aluminium and iron oxides, is very low. The composition C, which has a very low total content of aluminium and iron oxides, has a high solubility in culture medium, but a significantly lower solubility in a culture medium containing macrophages.

Fiber A, however, which is according to the invention and which has a considerably higher total aluminium and iron oxide content than the composition C, and which also contains phosphorus, has the same high solubility as the composition C in plain culture medium but, in addition, a correspondingly high solubility also in a culture medium containing macrophages.

The results thus show that in the compositions according to the invention, phosphorus has a solubility increasing effect which is especially pronounced in conditions resembling the true biological conditions in the organism.

We claim:

1. Mineral fiber composition which is soluble in biological fluids, consisting essentially of

| | | |
|---|---|---|
| SiO$_2$ | 49–56% | by weight |
| Al$_2$O$_3$ | 0.5–1.7 | " |
| Fe$_2$O$_3$ | 0–4 | " |
| CaO | 25–35 | " |
| MgO | 0–15 | " |
| Na$_2$O + K$_2$O | 0–6 | " |
| P$_2$O$_5$ | 0.5–5 | " |

2. The mineral fiber composition according to the claim 1, wherein said ratio is 0.5 to 2.

3. The mineral fiber composition according to the claim 2, wherein Al$_2$O$_3$ is included in an amount of 1 to 1.7% by weight.

\* \* \* \* \*